S. H. ROBERTS.
EMERGENCY CALK.
APPLICATION FILED NOV. 15, 1912.
1,128,627.
Patented Feb. 16, 1915.
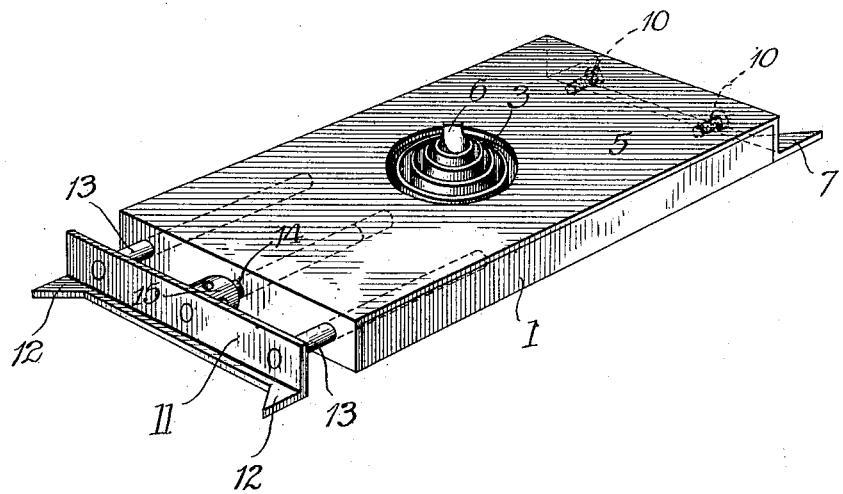
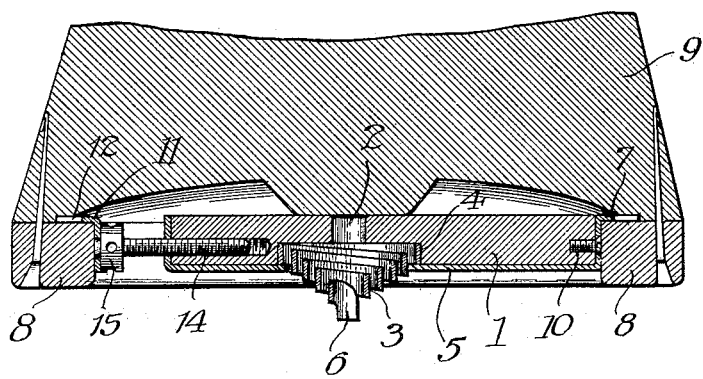
Witnesses.
Martin K. Olsen.
Leo J. Dumais.
Inventor
Samuel H. Roberts,
By Rummler & Rummler
Attys.

UNITED STATES PATENT OFFICE.

SAMUEL H. ROBERTS, OF JOLIET, ILLINOIS.

EMERGENCY-CALK.

1,128,627. Specification of Letters Patent. Patented Feb. 16, 1915.

Application filed November 15, 1912. Serial No. 731,530.

*To all whom it may concern:*

Be it known that I, SAMUEL H. ROBERTS, a citizen of the United States of America, and a resident of Joliet, county of Will, and State of Illinois, have invented certain new and useful Improvements in Emergency-Calks, of which the following is a specification.

The main objects of this invention are to provide an improved form of emergency calk which may be readily attached to a horse's hoof to prevent slipping at times when the calks of the horse's shoes have become worn smooth; to provide a calk of this kind which is adapted to project below the horse's shoe in such manner as to come into contact with the pavement in advance of the shoe and which is arranged to yield under the weight of the animal, so that it will not prevent the shoe itself from coming into proper contact with the pavement.

A specific embodiment of this invention is illustrated in the accompanying drawings, in which—

Figure 1 is a perspective view of the device in an inverted position. Fig. 2 is a vertical section showing the same in position on an animal's hoof.

The device shown comprises a solid block 1 of metal of substantially rectangular form having a centrally located counter-bored aperture or recess 2 extending through the same from face to face. A yielding calk 3 is seated in the counter-bored portion of the aperture 2 and comprises a flat strip of metal bent to helicoidal spiral form, and having its convolutions formed so as to give it a downwardly converging conical form and so as to telescope with each other, as shown in the drawings. The upper or largest convolution 4 of the spring 3 is seated in the counter-bore of the aperture 2, and is held in position therein by means of a plate 5 which has a contracted aperture mouth from which the remaining convolutions of the spring project. The innermost end of the spring 3 is bent downwardly to form the prong 6 of the calk. The plate 5 is bent upwardly around opposite ends of the block 1, and one end thereof is flanged and provided with prongs 7 which lie approximately in the plane of the top of the block 1 in position to enter between the shoe 8 and the animal's hoof 9. The plate 5 may be secured in position by machine screws 10, as shown. A clamping member 11 is mouted at the end of the block 1, which is distant from the prongs 7, and is provided with similar prongs 12 also lying approximately in the same plane as the top of the block 1. The member 11 may be formed of sheet metal of substantially the same thickness as the plate 5, and is bent to angle shape to give it stiffness and strength. The member 11 is carried by guide-rods 13 slidably mounted in parallel bores in the block 1, and its position, with respect to the block 1, is adjusted by means of an adjusting screw 14 which has an enlarged radially apertured head adapted to permit the screws to be turned by a suitable instrument, such as a wire nail.

To secure the device in position on an animal's foot, the prongs 7 are first inserted between one side of the shoe 8 and the hoof, and the block is then swung so as to lie against the frog of the foot with the prongs 12 directed toward the space between the shoe and hoof at the opposite side of the shoe. Then the screw 15 is turned so as to force the clamping member away from the block 1, until the clamping member 11 and the block 1 bear firmly against the inner faces of the shoe 8. It will be seen that at this time the prongs 7 and 12 will be firmly wedged between the hoof and the shoe, and will coöperate with the faces bearing against the shoe to prevent all movement of the block 1. As the animal walks, the prongs 6 will come into contact with the pavement in advance of the shoe, and will cut into the pavement so as to prevent slipping, and will then yield so as to allow the entire lower face of the shoe to bear the weight of the animal. It is important that the prong of an emergency calk should be the first part to engage the roadway, since it insures that the calk is driven into the pavement before any slipping can commence. The telescoping of the convolutions of the spring insures that each convolution will brace the next and thereby prevent lateral distortion of the spring in service.

Although but one specific embodiment of this invention has been herein shown and described, it will be understood that numerous details of the construction shown may be altered or omitted without departing from the spirit of this invention as defined by the following claims.

I claim:—

1. A device of the class described, comprising a rigid support adapted for detachable mounting within a horse shoe when the latter is attached to the hoof, said support being held with its lower face above the plane of the bearing face of the horse shoe and having a recess therein, and a downwardly projecting yieldable calk secured in said recess.

2. An emergency calk, comprising a support formed of relatively movable parts provided with members adapted to enter the space between the animal's shoe and hoof, one of said parts having parallel guide apertures and the other having corresponding guide rods adapted to slidably fit within said apertures, means for adjusting said parts toward and away from each other for clamping the same to an animal's hoof, and a calk yieldingly mounted on said support.

3. An emergency calk comprising a block provided with a face plate having upwardly turned opposite ends, one end of which turns outwardly to form fastening means adapted to enter between the hoof and shoe, in combination with a complementary member mounted at the opposite end and guided to move toward and away from said block, said complementary member being provided with fastening means directed oppositely from those on said block, and an adjusting screw acting between said block and complementary member, said block having in its lower face a recess with a contracted mouth, and a resilient yieldable calk carried by said block.

4. An emergency calk, comprising a block having an aperture counter-bored on the lower side of said block, a helicoidal spiral spring seated in the counter-bore and having its inner end bent downward to form a calk, a plate having therein an aperture in registry with said block aperture and through which said calk may extend, said aperture being of less diameter than the outermost convolution of said spring and said plate being secured over the same to retain said spring in position.

5. An emergency calk, comprising a block having an aperture counter-bored on the lower side of said block, a helicoidal spiral spring seated in the counter-bore and having its inner end bent downward to form a calk, a plate having therein an aperture in registry with said block aperture and through which said calk may extend, said aperture being of less diameter than the outermost convolution of said spring and said plate being secured over the same to retain said spring in position, one end of said plate being bent upwardly around the adjacent end of said block and being provided with prongs lying substantially in the plane of the upper face of said block and adapted to enter between the animal's shoe and hoof for retaining said block in position and a clamping member mounted at the opposite end of said block and provided with outwardly projecting prongs lying substantially in the plane of the upper face of said block.

Signed at Chicago this 12th day of Nov. 1912.

SAMUEL H. ROBERTS.

Witnesses:
EUGENE A. RUMMLER,
EDWIN PHELPS.

Copies of this patent may be obtained for five cents each, by addressing the "Commissioner of Patents, Washington, D. C."